United States Patent
Lange et al.

[19]

[11] Patent Number: 6,094,822
[45] Date of Patent: Aug. 1, 2000

[54] HEDGE CLIPPERS

[75] Inventors: Karl-Heinz Lange, Remshalden; Klaus Prach, Weinstadt; Christian Schwarz; Jochen Kramer, both of Waiblingen, all of Germany

[73] Assignee: Andreas Stihl AG & Co., Germany

[21] Appl. No.: 09/259,524

[22] Filed: Feb. 26, 1999

[30] Foreign Application Priority Data

Feb. 26, 1998 [DE] Germany .......................... 198 08 118

[51] Int. Cl.$^7$ .................................................. A01G 3/053
[52] U.S. Cl. .............................. 30/216; 30/382; 56/11.3; 188/77 W; 192/17 R
[58] Field of Search ........................... 30/210, 216, 228, 30/381–383; 56/11.3; 477/173, 200; 188/77 W, 77 R, 339; 192/17 R

[56] References Cited

U.S. PATENT DOCUMENTS

| | | | |
|---|---|---|---|
| 3,776,331 | 12/1973 | Gustafsson | 30/381 X |
| 4,148,173 | 4/1979 | Hoff | 56/11.3 |
| 4,416,107 | 11/1983 | Hoff | |
| 4,683,660 | 8/1987 | Schurr | |
| 4,793,064 | 12/1988 | Nagashima | 30/382 |
| 5,305,528 | 4/1994 | Garrison | 30/216 |
| 5,947,866 | 9/1999 | Nagashima | 56/11.3 X |

Primary Examiner—Douglas D. Watts
Attorney, Agent, or Firm—Robert W. Becker & Associates

[57] ABSTRACT

A hedge clipper is provided that has an internal combustion engine that is to be started by hand. By means of a clutch and a gear mechanism, the engine drives cutting blades in a reciprocating manner; the cutting blades are guided and held in a cutter bar. Disposed on the output side of the clutch is a brake drum around which extends a brake band. The first end of the brake band is fixed to the housing, and the second end of the brake band is held on a pivotable brake lever that is acted upon by a brake spring that urges the brake band into engagement against the brake drum. The brake lever can be moved into an inoperative position of the band brake by a release lever against the force of the brake spring. The release lever cooperates with an adjusting cam that is disposed directly adjacent to the brake lever and in the inoperative position of the band brake forms a rest stop for the brake lever, receiving the force of the brake spring.

18 Claims, 4 Drawing Sheets

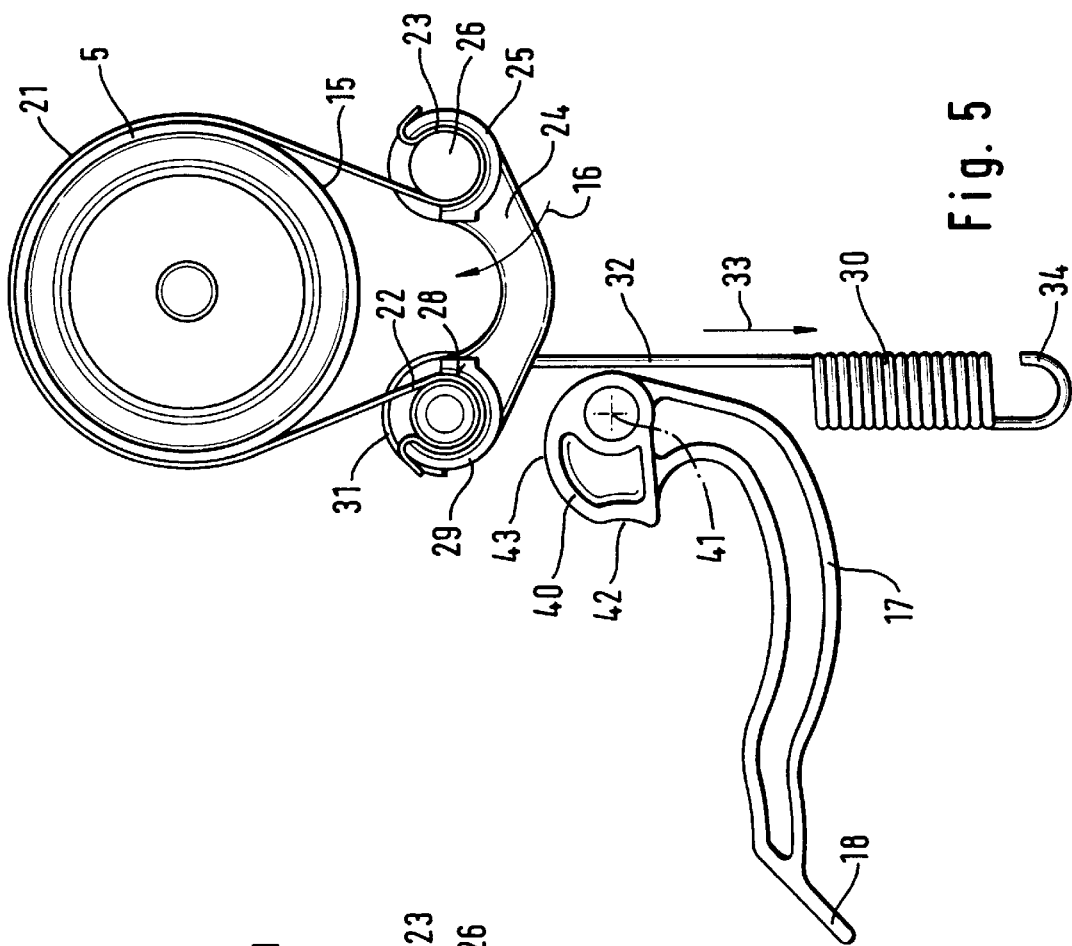
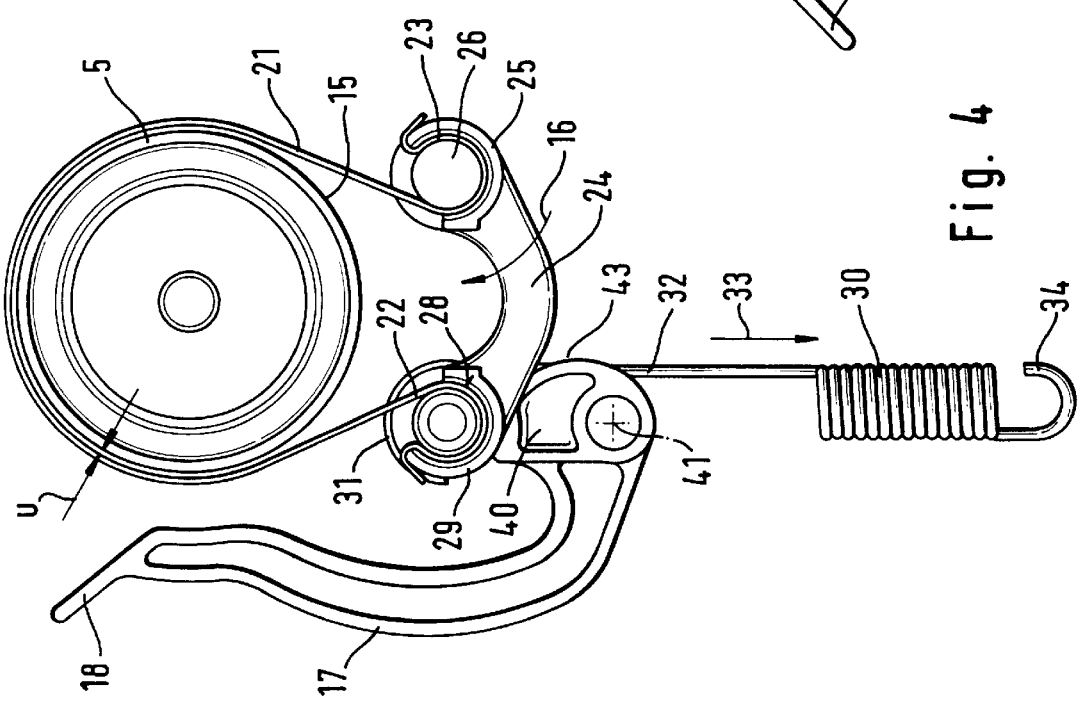

HEDGE CLIPPERS

BACKGROUND OF THE INVENTION

The present invention relates to a hedge clipper or trimmer having, as a drive motor, an internal combustion engine that is to be started by hand. By means of a clutch and a gear mechanism, the motor drives cutting blades in a reciprocating motion. The cutting blades are guided and held on a cutter bar that ends in a housing that contains the gear mechanism. Disposed on the output side of the coupling is a brake drum around which extends a brake band, the first end of which is fixed to the housing and the second end of which is held on a pivotable brake lever. A brake spring urges the brake band into engagement against the brake drum. The brake lever is adjustable via a release lever against the force of the spring into an inoperative position of the band brake.

For hedge clippers that are driven by an internal combustion engine, the drive of the gear mechanism that moves the cutting blades back and forth is effected by a centrifugal clutch, the clutch housing of which is non-rotatably connected with the gear mechanism and hence with the cutting edges. When the internal combustion engine is started by a rope pull starter, operating situations may occur that enable unintentional engagement of the centrifugal clutch and hence a driving of the cutting blades. For safety reasons, a brake is therefore required that is to be engaged during starting and should ensure that even in the event of an unintentional engagement of the centrifugal clutch at the time of starting, a driving of the cutting blades of the cutter bar is prevented.

It is known to dispose a brake band on the output side of the centrifugal clutch, generally on the clutch housing which is used as the brake drum, and to actuate the brake band by means of a brake lever. The brake lever is acted upon by the force of a brake spring in the direction of application of the brake band. The brake lever can be switched into an inoperative position by a Bowden cable against the force of the brake spring, in which case the switching lever for the band brake is disposed in the vicinity of the handle of the hedge clippers.

Although a band brake that can be switched in this manner has shown to be effective in practice, its construction and actuating elements are structurally complicated and expensive.

It is therefore an object of the present invention to improve a hedge clipper of the aforementioned general type in such a way that a band brake provided therefor can be operated and switched in a straightforward and operationally reliable manner with little technical expenditure.

BRIEF DESCRIPTION OF THE DRAWINGS

This object, and other objects and advantages of the present invention, will appear more clearly from the following specification in conjunction with the accompanying schematic drawings, in which:

FIG. 4 is a plan view of the band brake of FIG. 3; and

FIG. 5 is a plan view of FIG. 3 with the band brake applied.

SUMMARY OF THE INVENTION

The hedge clipper of the present invention is characterized primarily in that the release lever cooperates with an adjusting cam that is disposed directly adjacent to the brake lever and in the inoperative position of the band brake forms a rest stop for the brake lever, receiving the force of the brake spring. Complicated transmission elements, remote controls and the like can thus be avoided; the adjusting cam can be disposed close to the brake lever in such a way that by merely pivoting the adjusting cam, the stroke necessary for releasing the band brake is made available.

The adjusting cam is preferably associated with a free end of the brake lever, namely the free end that is also engaged by the brake spring. The force of the brake spring is thus directly supported by the adjusting cam.

The adjusting cam is preferably provided with a locking recess so that in the inoperative position of the brake lever, the adjusting cam is interlocked with the brake lever. This ensures a stable inoperative position; accidental release of the band brake during operation of the hedge clipper is precluded to a great extent.

Further specific features of the present invention will be described in detail subsequently.

DESCRIPTION OF PREFERRED EMBODIMENTS

Figure 1:
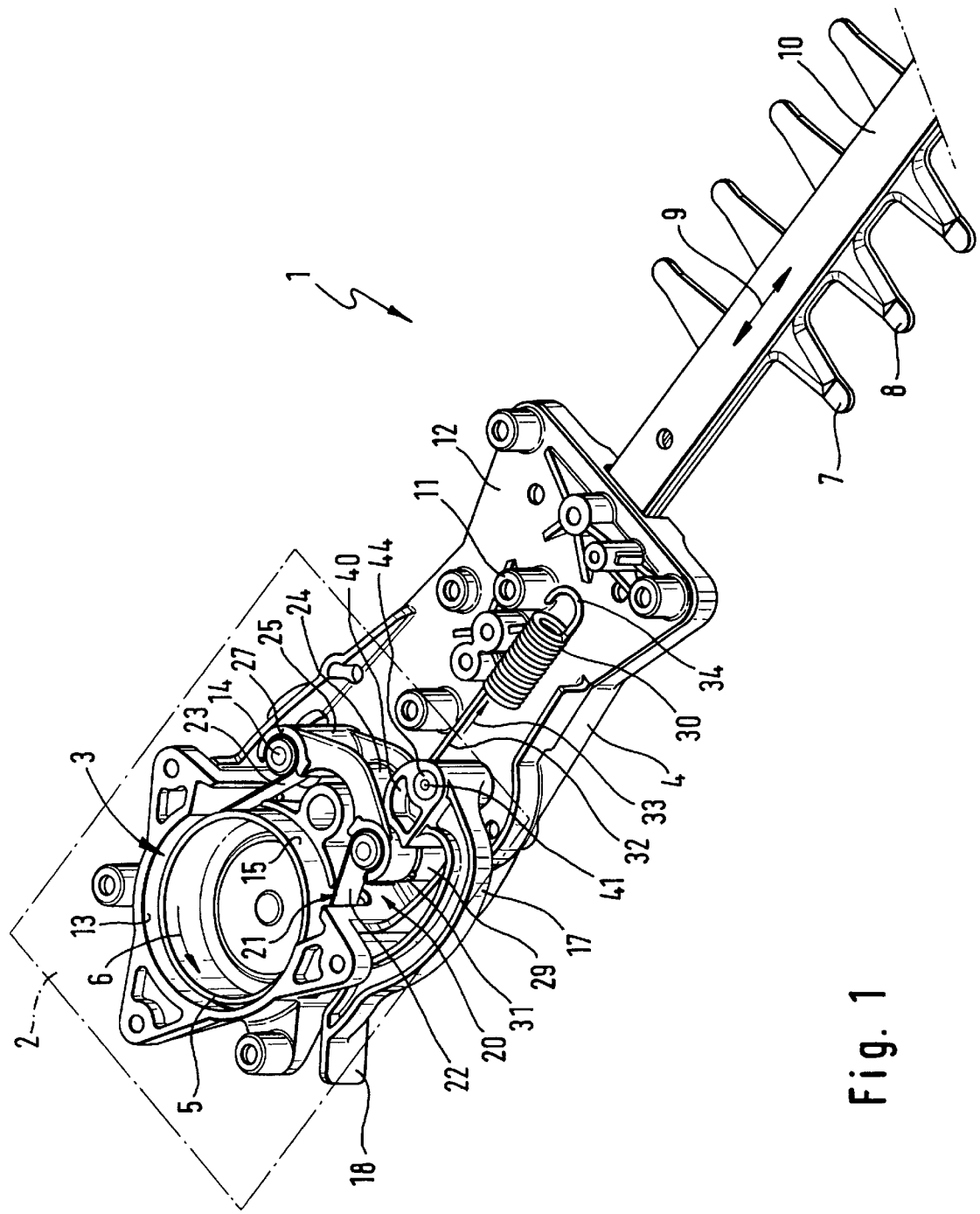
FIG. 1 is a perspective partial view of the gear mechanism of one exemplary embodiment of the inventive hedge clipper.

Referring now to the drawings in detail, FIG. 1 schematically shows a hedge clippers or trimmers 1, which are driven by a diagrammatically indicated drive motor 2. The drive motor is preferably an internal combustion engine that is capable of being started by hand, for example a two stroke engine, a four stroke engine or the like. The drive motor 2 is connected by means of a clutch 3 to a gear mechanism that is not shown in detail and that is disposed in a gear casing 4. If the clutch drum 5 rotates in the direction of the arrow 6, then by means of the gear arrangement disposed in the gear casing 4, the cutting blades 7 and 8 are reciprocated in the direction of the double arrow 9. For this purpose, the cutting blades 7 and 8 are mounted on a cutter bar 10 that extends in the longitudinal direction of the hedge clippers. The cutting blade 7 and 8 comprise cutting fingers that project transversely with respect to the cutter bar; each cutting finger cooperates with adjacent cutting fingers.

At its end adjacent to the gear mechanism, the cutter bar 10 preferably terminates in the gear casing 4 and is fixed to a housing plate 12, for example by means of screws in fastening domes 11. The housing plate 12 is in this connection disposed parallel to the plane of the cutter bar 10.

The clutch 3 is preferably embodied as a centrifugal clutch, on the output side of which is disposed a brake drum of a band brake 20. The clutch drum or housing 5 preferably forms the brake drum of the band brake 20 and is disposed in a clutch housing 13 that is disposed on the gear casing 4 and preferably forms a structural unit therewith.

A brake band 21 is wound around the brake drum 5, the friction pairing being formed between the outer surface 15 of the brake drum 5 and the brake band 21. The ends 22 and 23 of the brake band 21 project from the basically closed clutch housing 13, whereby the first end 23 is fixed to the housing and the second end 22 is held on a pivotable brake lever 24.

The brake lever 24 is preferably a single-arm pivot lever, the one end 25 of which has extending therethrough a bearing or a support bolt 14, which is expediently fixed at right angles on the housing plate 12. The brake lever 24 has a height "h" measured in the direction of the bearing bolt 14, i.e. of the pivot axis of the brake lever, with this height corresponding approximately to the height H of the brake drum 5 measured in the axial direction. The first end 23 of the brake band 21 engages around the bearing bolt 14, as a result of which the end 23 is fixed to the housing. The axial length of the bearing bolt 15 preferably corresponds to the height "h" of the brake lever 24, i.e. the axial length of the bearing hole or bore 26 in the end 25 of the brake lever 24. In this connection, the brake band end 23 is accommodated in a receiving gap 27 that is in the form of a partial ring and is formed between the bearing bolt 14 and an end section of the bearing bore 26 (see also FIG. 3).

The second end 22 of the brake band 21 is held axially in a receiving groove 28 that is the form of a partial ring and is formed in the free end 29 of the brake lever 24. In this connection, the free end 29 is shaped similar to a cylinder, with the cylinder axis being disposed parallel to the bearing axis of the bearing bolt 14. The partially ring-shaped receiving groove 28 is axially formed from one end face.

One end 31 of a brake spring 30 extends around the cylindrical, free end 29 of the brake lever 24. In this connection, one end section 32 of the brake spring 30 extends through the brake lever 24 adjacent to the free end 29, so that the end section 32 comes to rest on that side of the cylindrical, free end 29 that faces the bearing bolt 14. This has the advantage that an adjusting cam 40 that is associated with the free end 29 can be disposed directly behind the free end as viewed in the direction of pull 33 of the brake spring 30. The end 31 of the end section 32 of the brake spring 30 engages around the cylindrical free end 29 of the brake lever 24 from the inside toward the outside. The other end 34 of the brake spring is fixed to the housing, for example by being suspended on a fastening dome 11.

Figure 2:
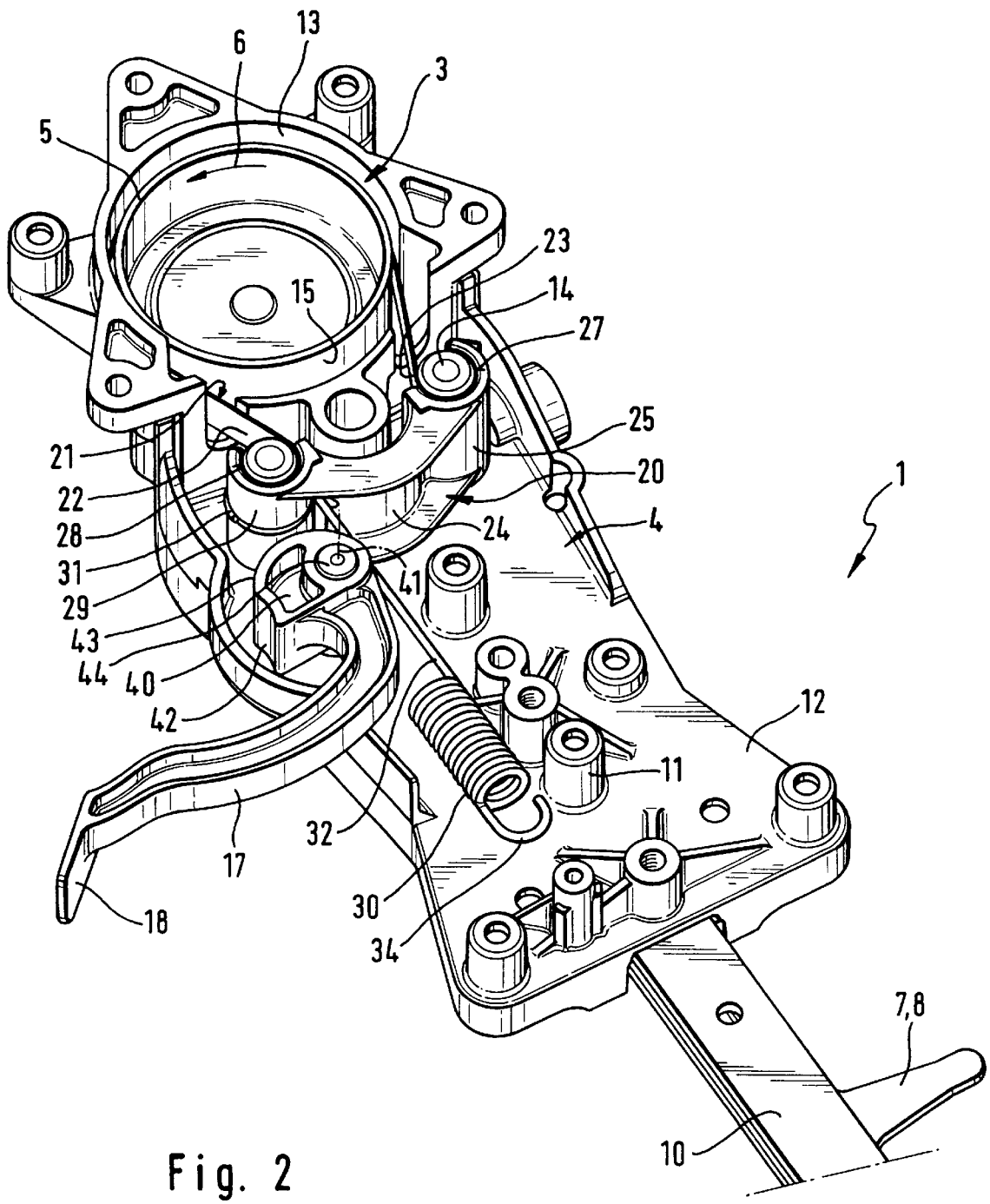
FIG. 2 is an enlarged partial view of FIG. 1 with the band brake applied.

Due to the direction of pull 33 of the brake spring 30, the brake lever 24 is acted upon by the spring force in a direction of application of the brake band 21. If, as shown in FIGS. 2 and 5, the free end 29 of the brake lever 24 is released, the brake spring 30 brings about an engagement of the brake band 21 against the outer surface 15 of the clutch housing 5, as a result of which the output member of the clutch 3 is stopped and hence also the cutting blades 7 and 8 are stopped, which are non-rotatably connected to the clutch housing 5 by means of the gear mechanism in the gear casing 4.

The inoperative position of the band brake 20 is determined by the adjusting cam 40, which is adjustable into the pivot path of the free end 29 of the brake lever 24. For this purpose, the adjusting cam 40 is pivotable about an axis 41 behind the brake lever 24, as a result of which the brake lever is pivoted forwardly about the bearing bolt 14 in the direction of the arrow 16 and in a direction toward the brake drum 5 for the purpose of releasing the band brake, so that, as shown in FIG. 4, the brake band is spaced by a distance "u" from the outer surface 15 of the clutch housing or brake drum 5. The clutch housing 5 can now rotate in an unhindered manner. The brake band 21 has a height "b", which is preferably less than the height "h" of the clutch housing 5, being approximately half as great.

Figure 3:
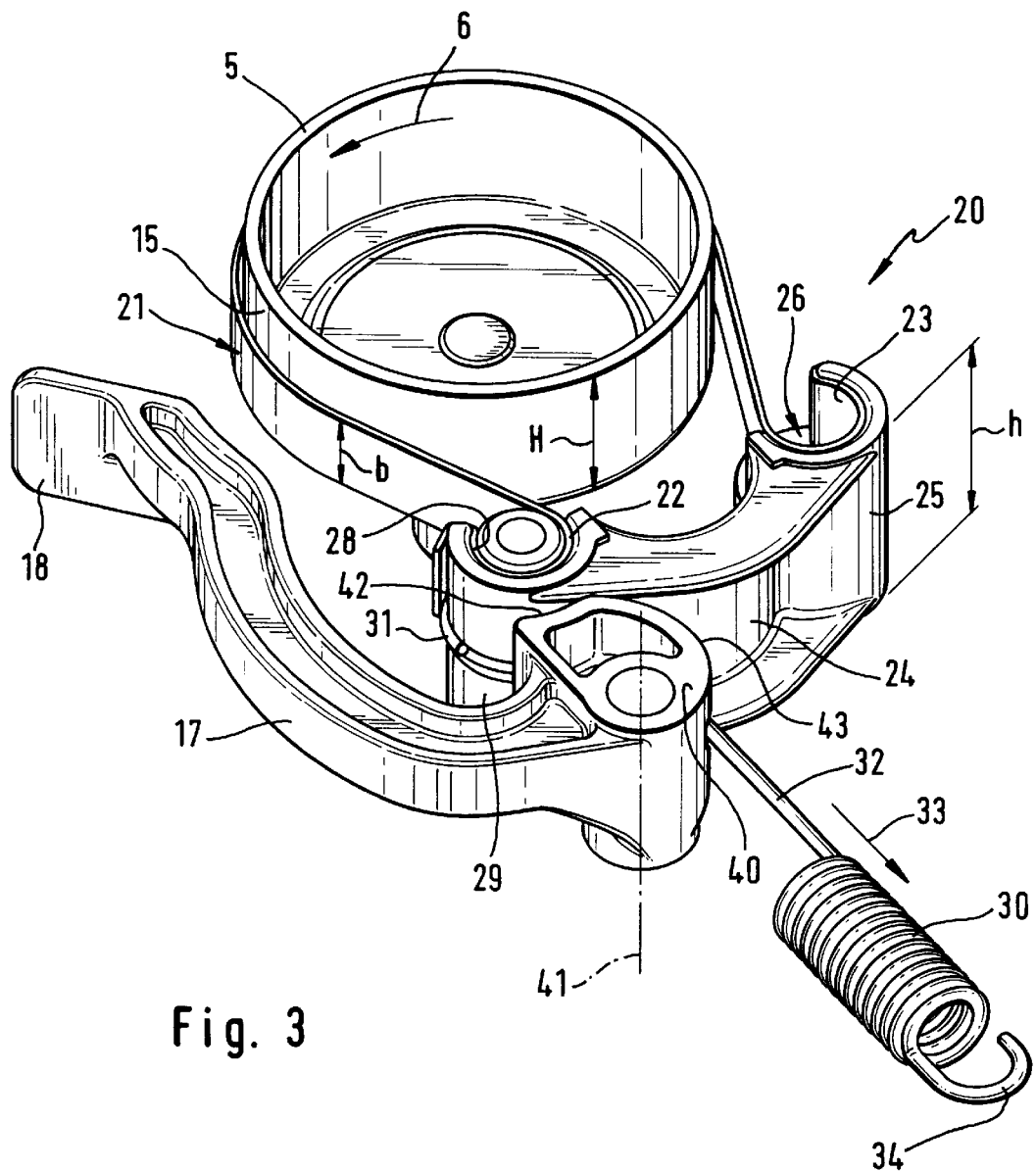
FIG. 3 is a perspective illustration of one exemplary embodiment of the inventive band brake for a hedge clipper in an inoperative position.

In the inoperative position of the band brake 20 shown in FIGS. 1, 3 and 4, the entire force of the brake spring 20 is absorbed by the adjusting cam 40, for which purpose the latter is pivotably held on the housing plate 12 by a bearing or support bolt 44. The adjusting cam 40 is connected to a release lever 17, preferably being constructed as one piece therewith, and in the inoperative position of the band brake 20 (FIGS. 1, 3, 4), fits close to the outer contour of the gear housing 4. When the band brake 20 is released (FIGS. 2, 5) the release lever 17 projects approximately at right angles from the gear casing 4 relative to the longitudinal central axis of the hedge clippers.

In the inoperative position of the brake lever 24, the adjusting cam 40, which forms the rest stop for the brake lever, is preferably interlocked with the brake lever. For this purpose, the cam expediently has a locking recess 42 in which a locking element of the brake lever 24 engages. In the illustrated embodiment, the locking recess 42 has the shape of part of a circle and is adapted to the outer edge of the cylindrical, free end 29 of the brake lever 24. The result of this is that due to the cylindrical contour, the adjusting cam can be pivoted with little application of force until the free end 29 engages in the locking recess 42. The adjusting cam 40 expediently has a curved path 43 that precedes the locking recess 42 and is embodied in such a way that it is easy to pivot the brake lever 24 about the bearing bolt 14 in the direction of the arrow 16 toward the brake drum 5. In this connection, the shape of the release lever 17 is such that in the inoperative position the release lever is essentially disposed within the contour of the hedge clipper housing, so that accidental release of the band brake by branches or the like can be precluded with high reliability. In order to ensure easy grasping and pivoting of the release lever out of the contour of the hedge clipper housing, the free end of the release lever is provided with a grip plate 18.

The brake lever 24 and/or the release lever 17 are expediently made of polymeric material.

The specification incorporates by reference the disclosure of German priority document 198 08 118.9 of Feb. 26, 1998.

The present invention is, of course, in no way restricted to the specific disclosure of the specification and drawings, but also encompasses any modifications within the scope of the appended claims.

What we claim:

1. A hedge clipper having, as a drive motor, an internal combustion engine that is to be started by hand, comprising:

a cutter bar that ends in a housing;

cutting blades that are held and guided on said cutter bar, said cutting blades being driven in a reciprocating motion by said engine via a clutch, and a gear mechanism that is contained in said housing;

a brake drum disposed on an output side of said clutch;

a brake band that extends around said brake drum, wherein a first end of said brake band is fixed relative to said housing;

a brake lever that is pivotably mounted relative to said housing, wherein a second end of said brake band is held on said brake lever;

a brake spring disposed on said housing for moving said brake band into engagement against said brake drum;

a release lever for moving said brake lever, against the force of said brake spring, into an inoperative position of said brake band, and an adjusting cam that is disposed directly adjacent to said brake lever and cooperates with said release lever, wherein in said inoperative position of said brake band said adjusting cam forms a rest stop for said brake lever, receiving the force of said brake spring.

2. A hedge clipper according to claim 1, wherein said adjusting cam cooperates with a free end of said brake lever.

3. A hedge clipper according to claim 2, wherein said adjusting cam and said release lever rotate about a common pivot axis.

4. A hedge clipper according to claim 3, wherein said adjusting cam and said release lever are constructed as a single piece.

5. A hedge clipper according to claim 3, wherein in said inoperative position of said brake band, said adjusting cam interlocks with said brake lever.

6. A hedge clipper according to claim 5, wherein said adjusting cam is provided with a locking recess for engagement by a locking element of said brake lever.

7. A hedge clipper according to claim 6, wherein said locking element of said brake lever is adapted to said locking recess and is formed by said free end of said brake lever.

8. A hedge clipper according to claim 5, wherein said brake lever is a one-armed pivot lever, one end of which is pivotably mounted relative to said housing via a bearing bolt.

9. A hedge clipper according to claim 8, wherein said first end of said brake band engages said bearing bolt.

10. A hedge clipper according to claim 9, wherein said first end of said brake band engages in a receiving gap that is in the form of a partial ring and is formed between said bearing bolt and an end portion of a bearing bore provided in said brake lever for said bearing bolt.

11. A hedge clipper according to claim 5, wherein said brake lever has a height that corresponds approximately to that of said brake drum.

12. A hedge clipper according to claim 5, wherein a first end of said brake spring extends through said brake lever and engages said free end of said brake lever.

13. A hedge clipper according to claim 5, wherein said brake drum is disposed in a largely closed clutch housing.

14. A hedge clipper according to claim 13, wherein said first and second ends of said brake band project out of said clutch housing.

15. A hedge clipper according to claim 5, wherein at least one of said brake lever and said release lever are made of polymeric material.

16. A hedge clipper according to claim 5, wherein in said inoperative position of brake band, said release lever fits closely to an outer contour of said housing, and when said brake lever is released said release lever projects approximately at right angles from said housing relative to a longitudinal central axis of said hedge clipper.

17. A hedge clipper according to claim 5, wherein said brake drum forms a clutch housing for said clutch of said internal combustion engine.

18. A hedge clipper according to claim 17, wherein said clutch is in the form of a centrifugal clutch.

* * * * *